US 8,248,749 B2

(12) United States Patent
Huang et al.

(10) Patent No.: US 8,248,749 B2
(45) Date of Patent: Aug. 21, 2012

(54) IONIC THERMAL DISSIPATION DEVICE

(75) Inventors: Wei-Chi Huang, Jhongli (TW);
Chi-Hsiung Lee, Jhongli (TW);
Yu-Hsiao Chao, Jhongli (TW);
Tsung-Liang Hung, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 166 days.

(21) Appl. No.: 12/869,776

(22) Filed: Aug. 27, 2010

(65) Prior Publication Data
US 2011/0308769 A1 Dec. 22, 2011

(30) Foreign Application Priority Data
Jun. 21, 2010 (CN) ...................... 2010 2 0231184 U

(51) Int. Cl.
*H01T 23/00* (2006.01)
(52) U.S. Cl. ....................... 361/230; 361/231
(58) Field of Classification Search .................. 361/230, 361/231
See application file for complete search history.

(56) References Cited

U.S. PATENT DOCUMENTS
4,941,353 A * 7/1990 Fukatsu et al. ............. 73/504.05
2011/0094710 A1 * 4/2011 Choudhary et al. ............ 165/96
* cited by examiner

*Primary Examiner* — Danny Nguyen
(74) *Attorney, Agent, or Firm* — Altis Law Group, Inc.

(57) ABSTRACT

An ionic thermal dissipation device includes an ionic wind generation system and a power system. The power system first converts external direct current (DC) power signals into first alternating current (AC) power signals, and boosts, increases voltage, and rectifies the first AC power signals to generate high voltage DC power signals to drive the ionic wind generation system. The power system also detects current signals generated by ion excitation of the ionic wind generation system and voltage signals of the high voltage DC power signals, and regulates the high voltage DC power signals and time of driving the ionic wind generation system according to a first PWM signal and a first analog signal from an electronic device and the detected current signals and voltage signals.

19 Claims, 4 Drawing Sheets

IONIC THERMAL DISSIPATION DEVICE

BACKGROUND

1. Technical Field

The disclosure relates to thermal dissipation devices, and particularly to an ionic thermal dissipation device.

2. Description of Related Art

Ionic thermal dissipation devices usually utilize voltage to drive ionic wind generation systems to excite ions to generate ionic wind. The ionic thermal dissipation devices have three states: an ionic non-excitation state, an ionic excitation state, and an arcing state with over-voltage. The driving voltage at the three states has minor differences. Usually, the driving voltage is regulated to make the ionic thermal dissipation device work in the ionic excitation state and avoid arcing. However, it is difficult to control velocity of the ionic wind.

DETAILED DESCRIPTION

Figure 1:
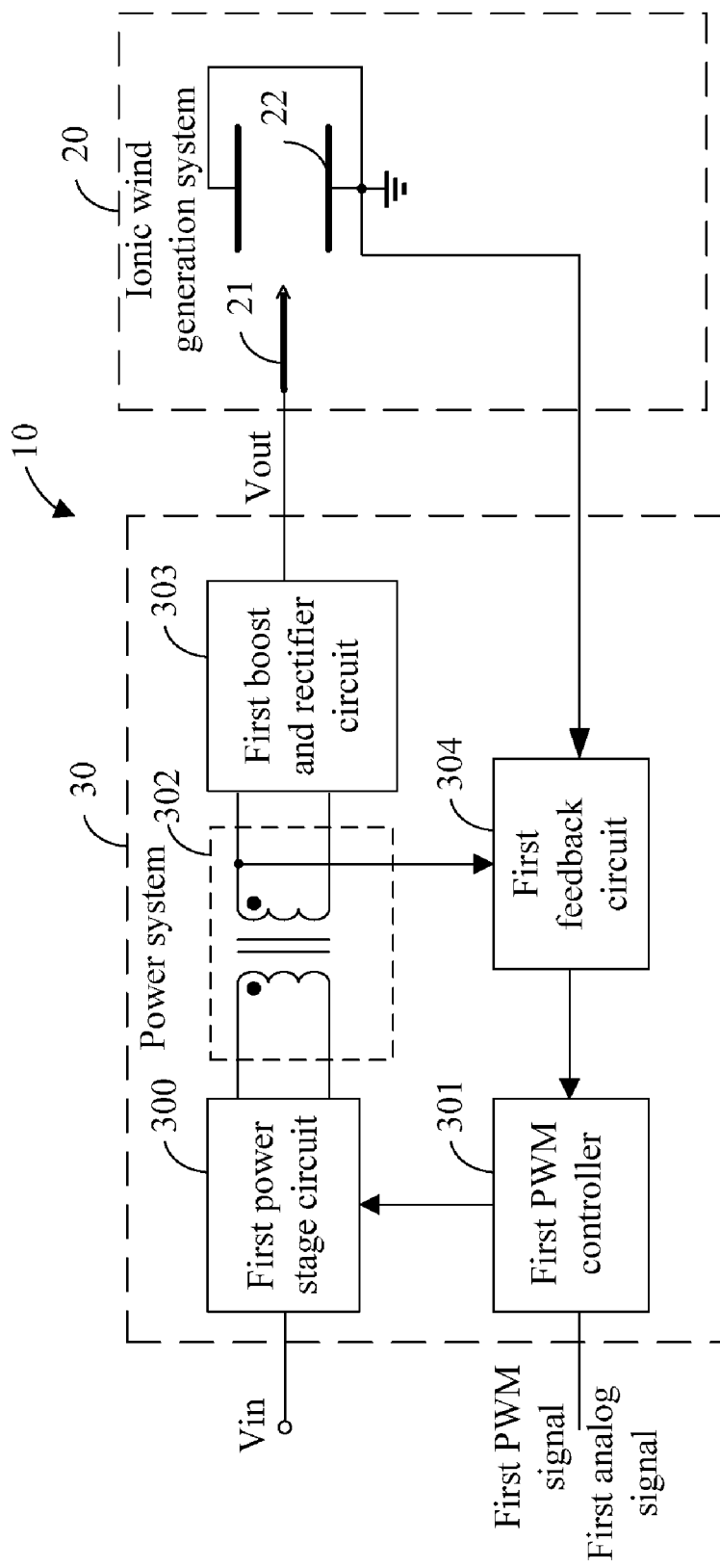
FIG. 1 is a schematic diagram of a first embodiment of an ionic thermal dissipation device as disclosed.

FIG. 1 is a schematic diagram of a first embodiment of an ionic thermal dissipation device 10 as disclosed. The ionic thermal dissipation device 10 is used for generating ionic wind for dissipating heat generated by electronic devices, such as, notebook computers, and includes a power system 30 and an ionic wind generation system 20. The power system 30 converts external direct current (DC) power signals Vin into high voltage DC power signals Vout, where the high voltage DC power signals Vout drive the ionic wind generation system 20 to generate ionic wind to dissipate heat. In one embodiment, the power system 30 includes a first power stage circuit 300, a first pulse width modulation (PWM) controller 301, a first transformer 302, a first boost and rectifier circuit 303, and a first feedback circuit 304. The ionic wind generation system 20 includes an emitting pole 21 and a receiving pole 22.

In one embodiment, the first power stage circuit 300 includes a DC to alternating current (AC) converter circuit to convert the external DC power signals Vin into first AC power signals. In alternative embodiments, the first power stage circuit 300 further includes a DC/DC converter circuit to regulate voltage level of the external DC power signals Vin. The first PWM controller 301 controls the first power stage circuit 300 to regulate voltage and frequency of the first AC power signals output by the first power stage circuit 300 according to a first PWM signal and a first analog signal input from the electronic device, to regulate voltage of the high voltage DC power signals Vout and time of driving the ionic wind generation system 20. In one embodiment, the first PWM signal may be digital signals with high or low logic levels (e.g., logical 1 and logical 0), and the first analog signal may be voltage signals, for example, voltage signals of 0~3.3/5V. The first transformer 302 may be a boost transformer to boost the first AC power signals. The first boost and rectifier circuit 303 can be used to increase voltage of the boosted first AC power signals and rectifies the boosted first AC power signals to generate the high voltage DC power signals Vout to drive the ionic wind generation system 20. In an exemplary embodiment, the first boost and rectifier circuit 303 doubles voltage of the boosted first AC power signals.

The emitting pole 21 of the ionic wind generation system 20 receives the high voltage DC power signals Vout, and excites air ionization to generate positive ions or negative ions. The positive ions or the negative ions move from the emitting pole 21 to the receiving pole 22, causing the ionic wind to be generated. At the same time, the movement of the positive ions or the negative ions between the emitting pole 21 and the receiving pole 22 forms a minor current between the emitting pole 21 and the receiving pole 22, such as, 0.1 to 0.5 mA, that is, current signals generated by ion excitation. If a distance between the emitting pole 21 and the receiving pole 22 is fixed, the current signals are proportionate to ion concentration of the ionic wind generation system 20. That is, the current signals are proportionate to velocity of the ionic wind. For example, when the distance between the emitting pole 21 and receiving pole 22 is 7 mm, if the current signal generated by the ion excitation is changed from 0.1 mA to 0.5 mA, the velocity of the ionic wind needs to be changed from 1.4 m/s to 2.0 m/s. In addition, when the ionic thermal dissipation device 10 arcs, the current signal becomes apparently high due to discharge between the emitting pole 21 and the receiving pole 22, for example, being 1 to 2 A.

The first feedback circuit 304 detects the current signals generated by the ion excitation of the ionic winding generation system 20 and voltage signals of the high voltage DC power signals Vout, and feedbacks the detected current signals and voltage signals to the first PWM controller 301 to regulate voltage and frequency of the first AC power signals output from the first power stage circuit 300, to regulate the voltage of the high voltage DC power signals Vout output by the power system 30.

In one embodiment, the first feedback circuit 304 is connected to connected to a high voltage end of a secondary winding of the first transformer 302 to detect the voltage signals of the high voltage DC power signals Vout. The first feedback circuit is also connected to the receiving pole 22 of the ionic wind generation system 20 to detect the current signals generated by the ion excitation of the ionic wind generation system 20.

The ionic thermal dissipation device 10 receives the first PWM signal and the first analog signal from the electronic device, regulates the voltage of the high voltage DC power signals Vout according to the first analog signal, and regulates time of effectively driving the ionic wind generation system 20 according to duty cycles of the first PWM signal. Thus, the velocity of the ionic wind can be easy and effectively controlled, and can be varied in a large area.

Figure 2:
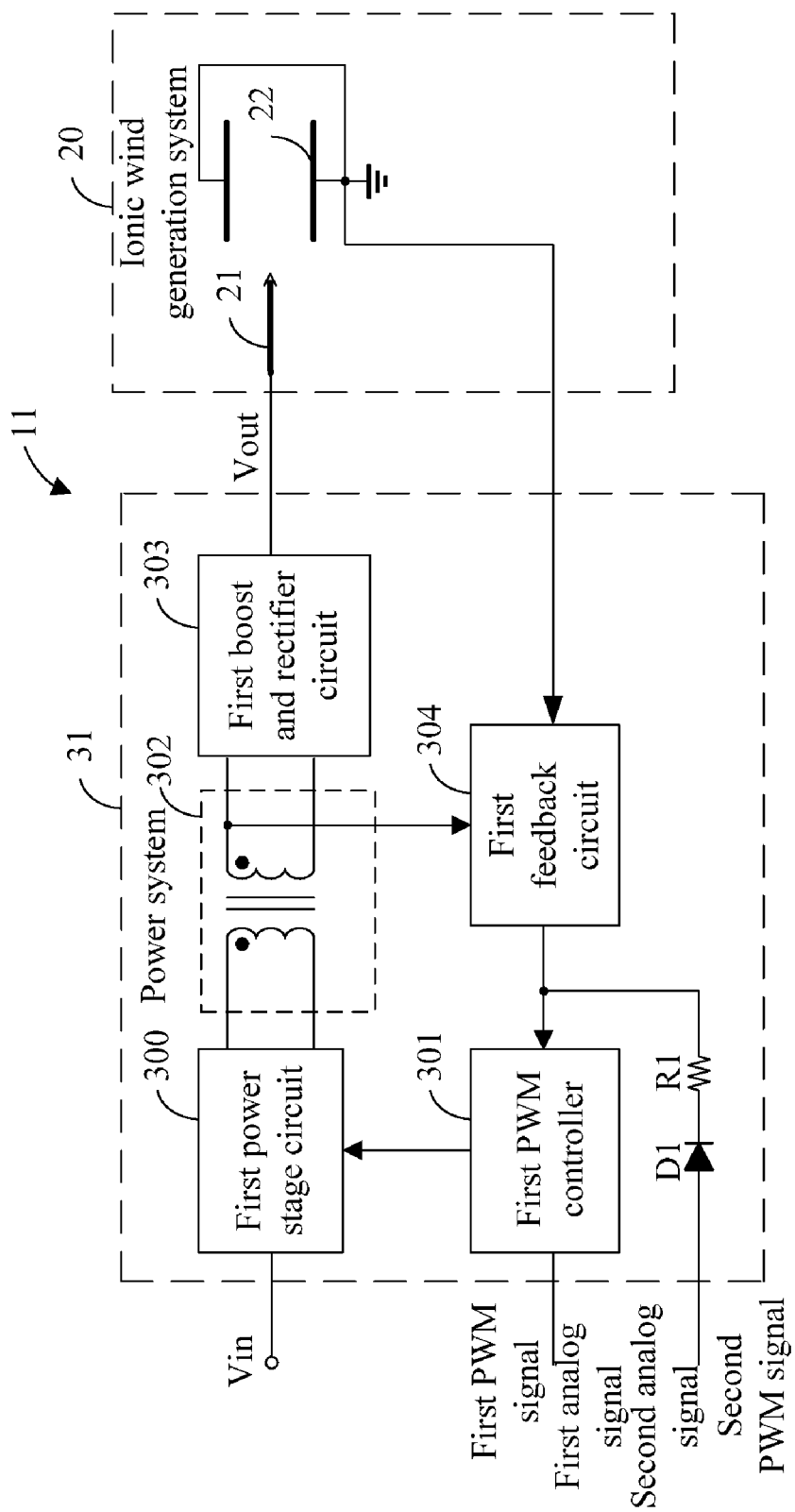
FIG. 2 is a schematic diagram of a second embodiment of an ionic thermal dissipation device as disclosed.

FIG. 2 is a schematic diagram of a second embodiment of an ionic thermal dissipation device 11 as disclosed. The ionic thermal dissipation device 11 is similar to the ionic thermal dissipation device 10 except that a power system 31 also receives at least one group of second analog signals and second PWM signals from the electronic device and superposes the at least one group of second analog signals and second PWM signals to the detected current signals and voltage signals output from the first feedback circuit 304 through a first diode D1 and a fist resistor R1, forming a combined signal including the at least one group of second analog signals and second PWM signals and the detected current signals and voltage signals. The first diode D1 and the first resistor R1 isolate the electronic device and the power system 31. The first PWM controller 301 regulates the voltage and frequency of the first AC power signals to regulate the voltage of the high voltage DC power signals Vout and the time of effectively driving the ionic thermal dissipation device 20 according to the superposed signals and the first analog signal and the first PWM signals. Thus, the power system 31 can much easier and effectively control the velocity of the ionic wind than the power system 30. In one embodiment, the second analog signal is the same as the first analog signal, and the second PWM signal is the same as the first PWM signal. In an alternative embodiment, the second analog signal is different from the first analog signal, and the second PWM signal is different from the first PWM signal.

Figure 3:
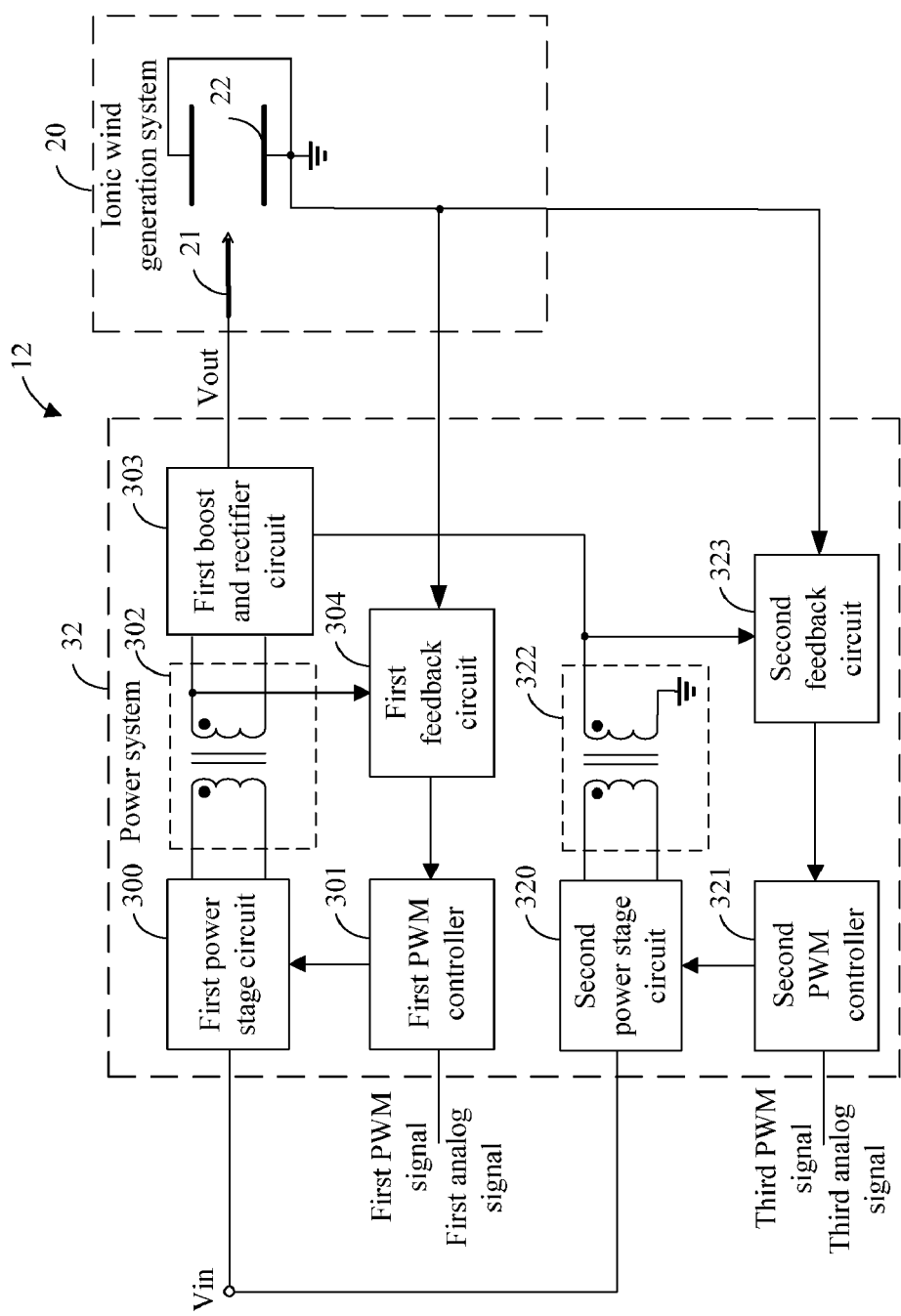
FIG. 3 is a schematic diagram of a third embodiment of an ionic thermal dissipation device as disclosed.

FIG. 3 is a schematic diagram of a third embodiment of an ionic thermal dissipation device 12. The ionic thermal dissipation device 12 is similar to the ionic thermal dissipation device 10 except that a power system 32 of the ionic thermal dissipation device 12 includes a second power stage circuit 320, a second PWM controller 321, a second transformer 322, and a second feedback circuit 323.

In one embodiment, the second power stage circuit 320 includes DC to alternating current (AC) converter circuit to convert the external DC power signals Vin into second AC power signals. In alternative embodiments, the second power stage circuit 320 further includes a DC/DC converter circuit to regulate voltage level of the external DC power signals Vin. The second PWM controller 321 controls the second power stage circuit 320 to regulate voltage and frequency of the second AC power signals output by the second power stage circuit 320 according to a third PWM signal and a third analog signal input from the electronic device. In one embodiment, the third PWM signal may be digital signals with high or low logic levels, and the third analog signal may be voltage signals, for example, voltage signals of 0~3.3/5V. The third PWM signal and the third analog signal may be respectively the same as the first and second PWM signals and the first and second analog signals. In alternative embodiments, the third PWM signal and the third analog signal may be respectively different from the first and second PWM signals and the first and second analog signals.

The second transformer 322 may be a boost transformer to boost the second AC power signals, and superposes the second AC power signals to the high voltage DC power signals Vout to commonly drive the ionic wind generation system 20.

The second feedback circuit 323 detects the current signals generated by the ion excitation of the ionic wind generation system 20 and voltage signals of the boosted second AC power signals, and feedbacks the detected current signals and voltage signals to the second PWM controller 321 to control the second power stage circuit 320 to regulate the voltage and frequency of the second AC power signals, to regulate the voltage of the boosted second AC power signals.

In one embodiment, the second feedback circuit 323 is connected to a high voltage end of a secondary winding of the second transformer 322 and the receiving pole 22 of the ionic winding generation system 20 to detect the current signals and voltage signal. The ionic thermal dissipation device 12 uses the high voltage DC power signals and the boosted second AC power signals to drive the ionic wind generation system 20, and has less power loss than that of the ionic thermal dissipation device 10.

Figure 4:
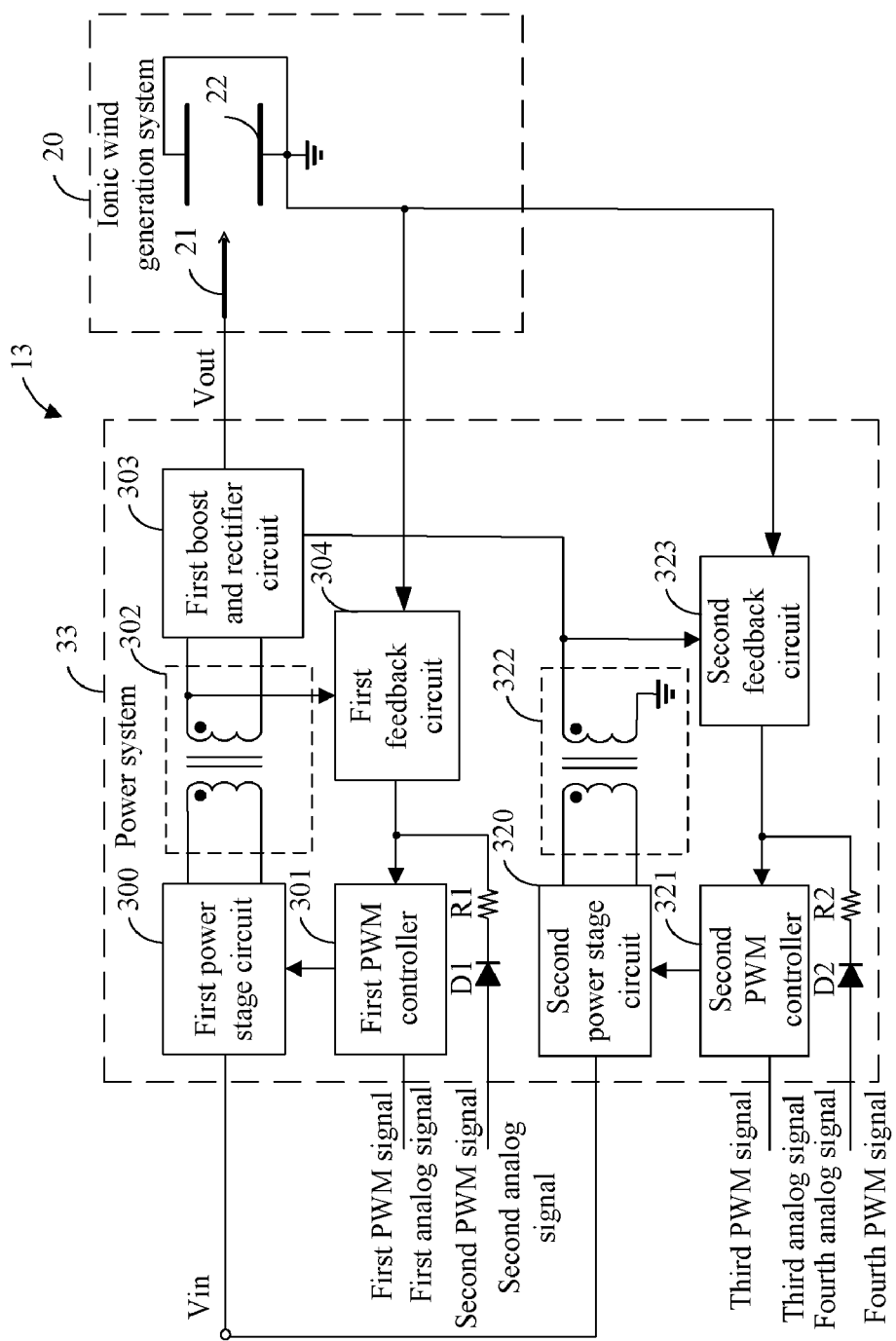
FIG. 4 is a schematic diagram of a fourth embodiment of an ionic thermal dissipation device as disclosed.

FIG. 4 is a schematic diagram of a fourth embodiment of an ionic thermal dissipation device 13 as disclosed. The ionic thermal dissipation device 13 is similar to the ionic thermal dissipation device 12 of FIG. 3 except that a power system 33 of the ionic thermal dissipation device 13 also receives at least one group of second analog signals and second PWM signals from the electronic device and superposes the at least one group of second analog signals and second PWM signals to the detected current signals and voltage signals output from the first feedback circuit 304 through a first diode D1 and a fist resistor R1. The power system 33 also receives at least one group of fourth analog signals and fourth PWM signals from the electronic device and superposes the at least one group of fourth analog signals and fourth PWM signals to the detected current signals and voltage signals output from the second feedback circuit 323 through a second diode D2 and a second resistor R2. The first diode D1 and the first resistor R1 and the second diode D2 and the second resistor R2 isolate the electronic device and the power system 33.

The first PWM controller 301 regulates the voltage and frequency of the first AC power signals to regulate the voltage of the high voltage DC power signals Vout and the time of effectively driving the ionic thermal dissipation device 20 according to the superposed signals and the first analog signal and the first PWM signals. The second PWM controller 321 regulates the voltage and frequency of the second AC power signals to regulate the voltage and the frequency of the boosted second AC power signals output by the second transformer 322 according to the superposed signals and the third PWM signal and the third analog signal. Thus, the first PWM controller 301 and the second PWM controller 321 commonly change the velocity of the ionic wind of the ionic wind generation system 20. The power system 33 can much easily and effectively control the velocity of the ionic wind than the power system 32, and has less power loss. In one embodiment, the first to the fourth analog signals are the same, and the first to the fourth PWM signal are the same. In alternative embodiment, the first to the fourth analog signals may be different, and the first to the fourth PWM signal may be different.

The ionic thermal dissipation devices 10 to 13 receive PWM signals and analog signals from the electronic device, regulates the voltage driving the ionic wind generation system 20 according to the analog signals, and regulate time of effectively driving the ionic wind generation system 20 according to duty cycles of the PWM signals. Thus, the velocity of the ionic wind can be easy and effectively controlled, and can be varied in a large area.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. An ionic thermal dissipation device, for dissipating heat generated by an electronic device, comprising:
 an ionic wind generation system; and
 a power system to power the ionic wind generation system, the power system comprising:
  a first power stage circuit, operable to convert external direct current (DC) power signals into first alternating current (AC) power signals;
  a first transformer, operable to boost the first AC power signals;
  a first boost and rectifier circuit, operable to increase voltage of the boosted first AC power signals and rectify the boosted first AC power signals to generate high voltage DC power signals suitable to drive the ionic wind generation system;

a first feedback circuit, operable to detect current signals generated by ion excitation of the ionic wind generation system and voltage signals of the high voltage DC power signals; and a first pulse width modulation (PWM) controller, operable to control the first power stage circuit to regulate the high voltage DC power signals and time of driving the ionic wind generation system according to a first PWM signal and a first analog signal from the electronic device and the detected current signals and voltage signals.

2. The ionic thermal dissipation device of claim 1, wherein the ionic wind generation system comprises:

an emitting pole, operable to receive the high voltage DC power signals to excite ions; and a receiving pole, operable to receive the ions excited by the emitting pole.

3. The ionic thermal dissipation device of claim 2, wherein the first feedback circuit is connected to a high voltage end of a secondary winding of the first transformer to detect the voltage signals of the high voltage DC power signals.

4. The ionic thermal dissipation device of claim 3, wherein the first feedback circuit is connected to the receiving pole of the ionic wind generation system to detect the current signals generated by the ion excitation of the ionic wind generation system.

5. The ionic thermal dissipation device of claim 1, wherein the power system further receives at least one group of second analog signals and second PWM signals from the electronic device, and superposes the at least one group of second analog signals and second PWM signals to the detected current signals and the detected voltage signals from the first feedback circuit through a first diode and a first resistor.

6. The ionic thermal dissipation device of claim 5, wherein the first PWM controller regulates the first AC power signals output from the first power stage circuit to regulate the high voltage DC power signals and the time of driving the ionic wind generation system according to the first PWM signal and the first analog signal and the superposed signals.

7. The ionic thermal dissipation device of claim 5, wherein the power system further comprises:

a second power stage circuit, operable to converting the external DC power signals into second AC power signals;

a second transformer, operable to boost the second AC power signals and superpose the boosted second AC power signals to the high voltage DC power signals;

a second feedback circuit, operable to detect the current signals generated by the ion excitation of the ionic wind generation system and voltage signals of the boosted second AC power signals; and a second PWM controller, operable to control the second power stage circuit according to a third PWM signal and a third analog signal from the electronic device and the detected current signals and voltage signals from the second feedback circuit.

8. The ionic thermal dissipation device of claim 7, wherein the power system further receives at least one group of fourth analog signals and fourth PWM signals from the electronic device, and superposes the at least one group of fourth analog signals and fourth PWM signals to the detected current signals and the detected voltage signals from the second feedback circuit through a second diode and a second resistor.

9. The ionic thermal dissipation device of claim 1, wherein the power system further comprises:

a second power stage circuit, operable to converting the external DC power signals into second AC power signals;

a second transformer, operable to boost the second AC power signals;

a second feedback circuit, operable to detect the current signals generated by the ion excitation of the ionic wind generation system and voltage signals of the boosted second AC power signals; and a second PWM controller, operable to control the second power stage circuit according to a third PWM signal and a third analog signal from the electronic device and the detected current signals and voltage signals from the second feedback circuit.

10. The ionic thermal dissipation device of claim 9, wherein the power system further receives at least one group of fourth analog signals and fourth PWM signals from the electronic device, and superposes the at least one group of fourth analog signals and fourth PWM signals to the detected current signals and the detected voltage signals from the second feedback circuit through a second diode and a second resistor.

11. A power system, to power an ionic wind generation system to generate ionic wind for dissipating heat generated by an electronic device, the power system comprising:

a first power stage circuit, operable to convert external direct current (DC) power signals into first alternating current (AC) power signals;

a first transformer, operable to boost the first AC power signals;

a first boost and rectifier circuit, operable to increase voltage of the boosted first AC power signals and rectify the boosted first AC power signals to generate high voltage DC power signals suitable to drive the ionic wind generation system;

a first feedback circuit, operable to detect current signals generated by ion excitation of the ionic wind generation system and voltage signals of the high voltage DC power signals; and a first pulse width modulation (PWM) controller, operable to control the first power stage circuit to regulate the high voltage DC power signals and time of driving the ionic wind generation system according to a first PWM signal and a first analog signal from the electronic device and the detected current signals and voltage signals.

12. The power system of claim 11, wherein the first feedback circuit is connected to a high voltage end of a secondary winding of the first transformer to detect the voltage signals of the high voltage DC power signals.

13. The power system of claim 11, wherein the first feedback circuit is connected to a receiving pole of the ionic wind generation system to detect the current signals generated by the ion excitation of the ionic wind generation system.

14. The power system of claim 11, wherein the power system further receives at least one group of second analog signals and second PWM signals from the electronic device, and superposes the at least one group of second analog signals and second PWM signals to the detected current signals and the detected voltage signals from the first feedback circuit through a first diode and a first resistor.

15. The power system of claim 14, wherein the first PWM controller regulates the first AC power signals output from the first power stage circuit to regulate the high voltage DC power signals and the time of driving the ionic wind generation system according to the first PWM signal and the first analog signal and the superposed signals.

16. The power system of claim 14, further comprising:
a second power stage circuit, operable to converting the external DC power signals into second AC power signals;
a second transformer, operable to boost the second AC power signals and superpose the boosted second AC power signals to the high voltage DC power signals;
a second feedback circuit, operable to detect the current signals generated by the ion excitation of the ionic wind generation system and voltage signals of the boosted second AC power signals; and
a second PWM controller, operable to control the second power stage circuit according to a third PWM signal and a third analog signal from the electronic device and the detected current signals and voltage signals from the second feedback circuit.

17. The power system of claim 16, wherein the power system further receives at least one group of fourth analog signals and fourth PWM signals from the electronic device, and superposes the at least one group of fourth analog signals and fourth PWM signals to the detected current signals and the detected voltage signals from the second feedback circuit through a second diode and a second resistor.

18. The power system of claim 11, further comprising:
a second power stage circuit, operable to converting the external DC power signals into second AC power signals;
a second transformer, operable to boost the second AC power signals;
a second feedback circuit, operable to detect the current signals generated by the ion excitation of the ionic wind generation system and voltage signals of the boosted second AC power signals; and
a second PWM controller, operable to control the second power stage circuit according to a third PWM signal and a third analog signal from the electronic device and the detected current signals and voltage signals from the second feedback circuit.

19. The power system of claim 18, wherein the power system further receives at least one group of fourth analog signals and fourth PWM signals from the electronic device, and superposes the at least one group of fourth analog signals and fourth PWM signals to the detected current signals and the detected voltage signals from the second feedback circuit through a second diode and a second resistor.

* * * * *